United States Patent [19]
Hartner et al.

[11] Patent Number: 5,966,543
[45] Date of Patent: Oct. 12, 1999

[54] METHOD OF USING COLLABORATIVE SPINLOCKS TO PROVIDE EXCLUSIVE ACCESS TO A RESOURCE IN A MULTIPROCESSOR COMPUTER SYSTEM

[75] Inventors: William H. Hartner; David Medina; Mark A. Peloquin; Charles R. Schmitt, all of Austin, Tex.; James F. Macon, Jr., Apex, N.C.

[73] Assignee: International Business Machines Corporation, Armonk, N.Y.

[21] Appl. No.: 08/883,113

[22] Filed: Jun. 26, 1997

[51] Int. Cl.[6] .......................... G06F 13/14; G06F 15/163
[52] U.S. Cl. ...................... 395/726; 395/375; 395/474; 395/425; 395/681; 395/683; 395/733; 395/734; 395/840; 395/868; 364/228.1; 364/230; 364/230.2; 364/280; 364/280.8; 364/281.3; 364/975.4

[58] Field of Search ...................................... 395/726, 733, 395/734, 681, 683, 840, 868, 375, 474, 425; 364/228.1, 230, 230.2, 280, 280.8, 281.3, 975.4

[56] References Cited

U.S. PATENT DOCUMENTS

| | | |
|---|---|---|
| 4,604,694 | 8/1986 | Hough . |
| 5,023,773 | 6/1991 | Baum et al. . |
| 5,113,522 | 5/1992 | Dinwiddie, Jr. et al. . |
| 5,274,823 | 12/1993 | Brenner et al. .......................... 395/725 |
| 5,394,547 | 2/1995 | Correnti et al. . |
| 5,442,758 | 8/1995 | Slingwine et al. . |
| 5,446,842 | 8/1995 | Schaeffer et al. . |
| 5,469,571 | 11/1995 | Bunnel .................................... 395/700 |
| 5,502,840 | 3/1996 | Barton .................................... 395/726 |
| 5,535,416 | 7/1996 | Feeney et al. . |
| 5,560,018 | 9/1996 | Macon, Jr. et al. . |
| 5,604,887 | 2/1997 | Naidu et al. . |
| 5,608,893 | 3/1997 | Slingwine et al. . |
| 5,790,851 | 8/1998 | Frank et al. ............................. 395/674 |

FOREIGN PATENT DOCUMENTS

| | | |
|---|---|---|
| 543560A2 | 11/1992 | European Pat. Off. . |
| 564256A2 | 3/1993 | European Pat. Off. . |
| WO9419752 | 9/1994 | WIPO . |

OTHER PUBLICATIONS

Steven Kleiman et al.; Symmetric multiprocessing in Solaris 2.0; IEEE, 1992; p. 181–186.

By Michael S. Kogan, Retrofitting OS/2 for SMP; Core technologies; Jun. 1994.

By Ted Waldron III; OS/2's Symmetrical Multiprocessing Demystified; EDM/2, vol. 5, Issue 9, Sep. 1997.

Takada et al., "Queuing Spin Lock Algorithms with Preemption," Systems and Computers in Japan, vol. 27, No. 5 (1996).

*Primary Examiner*—Ayaz R. Sheikh
*Assistant Examiner*—Frantz Blanchard Jean
*Attorney, Agent, or Firm*—Jeffrey S. LaBaw; David H. Judson

[57] ABSTRACT

A multiprocessor computing system has memory shared by all processors of the computing system and includes an symmetric multiprocessor (SMP) operating system and at least one external device controlled by a device driver. The device driver is typically written to run in a uniprocessor environment. A method for protecting the execution state of the device driver uses a pair of "collaborative" spinlocks, an interrupt time spinlock and a task time spinlock. At task time, prior to calling the device driver, the task time spin lock is acquired by the operating system. The operating system then waits until the interrupt time spinlock is in an "unowned" state before calling the device driver. Upon return from the device driver, the operating system releases the task time spinlock. At interrupt time, prior to calling the device driver's interrupt handler, the interrupt time spinlock is acquired by the operating system. The operating system then determines if the task time spinlock is owned. If it is owned, the operating system then issues an interprocessor interrupt (IPI) to the processor owning the task time spinlock, thus placing that processor into a predetermined "spin" state. The receiving processor remains in the spinning state until return of the device driver execution.

29 Claims, 2 Drawing Sheets

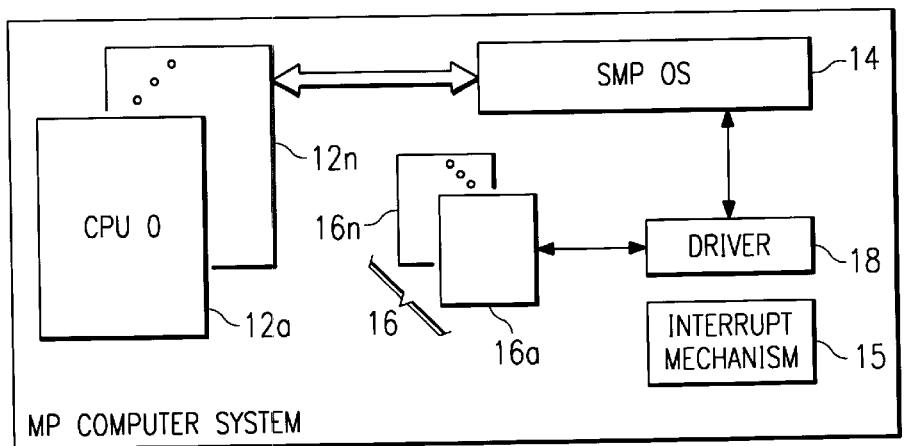
FIG. 1
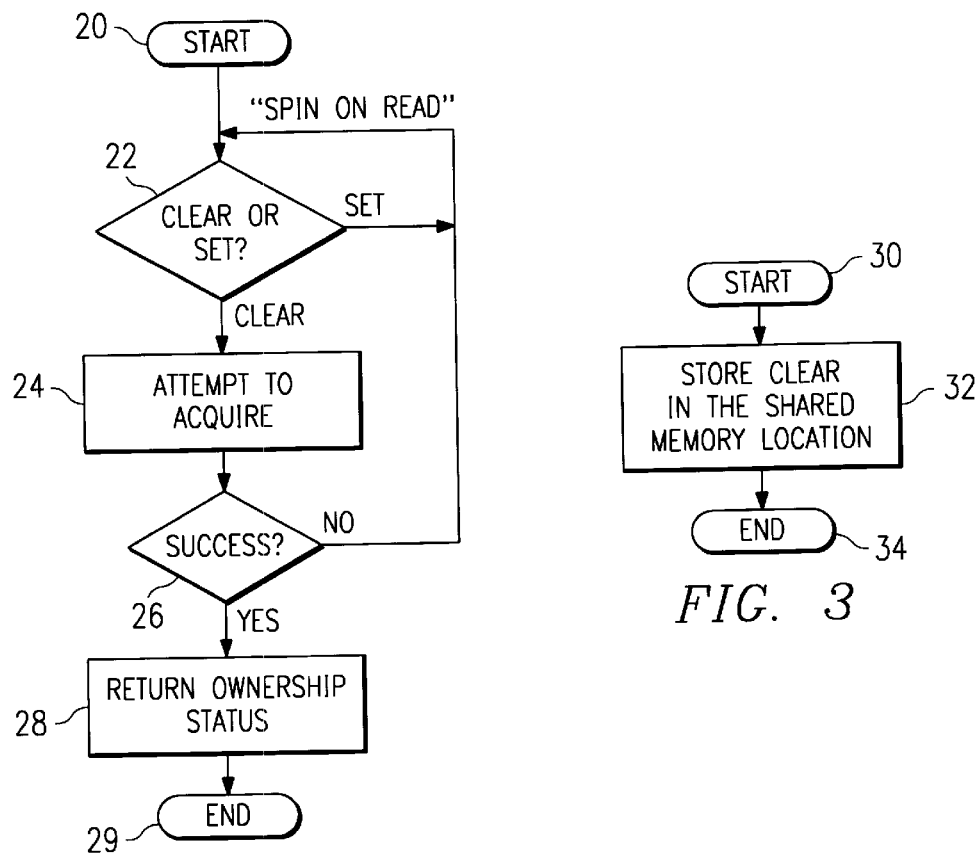
FIG. 2
FIG. 3

METHOD OF USING COLLABORATIVE SPINLOCKS TO PROVIDE EXCLUSIVE ACCESS TO A RESOURCE IN A MULTIPROCESSOR COMPUTER SYSTEM

BACKGROUND OF THE INVENTION

1. Technical Field

The present invention relates generally to multiprocessor (MP) computer systems and more particularly to the use Of collaborative "spinlocks" in a symmetric multiprocessor (SMP)-based operating system to prevent concurrent access to an operating system kernel extension such as a device driver.

2. Description of the Related Art

A device driver is a known operating system kernel extension. Most device drivers in use today in multiprocessor (MP) computer systems were written for uniprocessor operating systems rather than a symmetric multiprocessor-based operating system. Consequently, the writers of these drivers never envisioned a situation where two processors would request the services of the driver concurrently.

Such known device drivers include a "task time" component and an "interrupt time" component. The task time component is used to request services of a device managed by the device driver. The request typically completes asynchronously and, thereafter, the device driver is notified of such completion via external interrupt. Mutual exclusion to data structures shared by the task time component and the interrupt time component is typically provided by using the Intel CLI (disable interrupt) and STI (enable interrupt) instructions. In particular, issuing the CLI instruction prevents external interrupts, thus protecting the data structures from the interrupt time component.

The use of the Intel CLI instruction to provide mutual exclusion to data structures will not work in a MP environment, however. In particular, an Intel CLI instruction executed from one processor in the system will not disable interrupts on every processor; therefore, the interrupt time component may be executing on one processor while the task time processor is executing on another processor. Ultimately, the data structures will be corrupted.

One possible method to solve this problem would be to force execution of both the task time and interrupt time components of all device drivers to a single processor. Such an approach, in effect, would emulate the environment for which the device driver was originally designed. The performance of the MP system using this approach is quite unacceptable. Another approach would be to use a single "spinlock" to protect both the task time and interrupt component of the device driver. As is known in the art, a spinlock is a software mechanism involving a shared memory location having a set of known states that imply "ownership" (or the lack thereof) with respect to a given resource associated with the spinlock. A single spinlock has been used in an MP environment to provide external interrupt serialization, as described in U.S. Pat. No. 5,560,018 to Macon, Jr. et al., which patent is assigned to the assignee of this application. This approach, while satisfactory, does not provide optimal performance, in part because of the increased interrupt latency which is introduced while waiting for the device driver to release the single spinlock.

Understandably, authors of existing device driver code are not interested in rewriting the driver simply to adapt it to a multiprocessor operating system. Therefore, another means of allowing the efficient use of these existing device drivers must be developed. The present invention addresses this important problem.

SUMMARY OF THE INVENTION

Thus, it is a general object of this invention to control access to a system resource in a multiprocessor operating system environment.

It is a more specific object of the invention to use two or more "collaborative" spinlocks to control access to the resource by the MP operating system.

It is still another more specific object to control access to an operating system kernel extension (e.g., a device driver) originally written for a uniprocessor environment but that is running in a multiprocessor environment without modification to the kernel extension.

It is yet another particular object of this invention to use a pair of collaborative spinlocks to prevent concurrent access to a device driver written for a uniprocessor environment.

A still further object of this invention is to protect operating system resources in an symmetric multiprocessor (SMP) operating system environment.

Yet another aspect of this invention is to allow different processors in a multiprocessor computer system to access a device driver without corrupting data structures associated with the task time and interrupt components of the device driver.

These and other objects of the invention are implemented in a multiprocessor computing system having memory shared by all processors of the system and including an symmetric multiprocessor (SMP) operating system. The computing system includes at least one external device controlled by a device driver having an interrupt handler. The device driver is typically written to run in a uniprocessor environment. A method for protecting the execution state of the device driver uses a pair of "collaborative" spinlocks, an "interrupt time" spinlock and a "task time" spinlock. At task time, and prior to calling the device driver, the task time spinlock is acquired by the operating system. The operating system then waits until the interrupt time spinlock is in an "unowned" state before calling the device driver. Upon return from the device driver, the operating system releases the task time spinlock. At interrupt time, and prior to calling the device driver's interrupt handler, the interrupt time spinlock is acquired by the operating system. The operating system then determines if the task time spinlock is owned. If the task time spinlock is unowned, the operating system calls the device driver's interrupt handler. If, however, the task time spinlock is owned, the operating system first issues an interprocessor interrupt (IPI) to the processor owning the task time spinlock, thus placing that processor into a predetermined "spin" state. In particular, the processor receiving the IPI is "spun" on a predetermined memory location until the memory location is cleared. Upon return from execution of the device driver, the interrupt time spinlock is released and the spun processor is returned to its prior operating state.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 1 is a block diagram of a representative multiprocessor computer system in which the present invention is implemented;

FIG. 2 is a flowchart of a known technique for acquiring a spinlock;

FIG. 3 is a flowchart of a known technique for releasing the spinlock acquired by the flowchart of FIG. 2;

DETAILED DESCRIPTION OF THE PREFERRED EMBODIMENT

Figure 4:
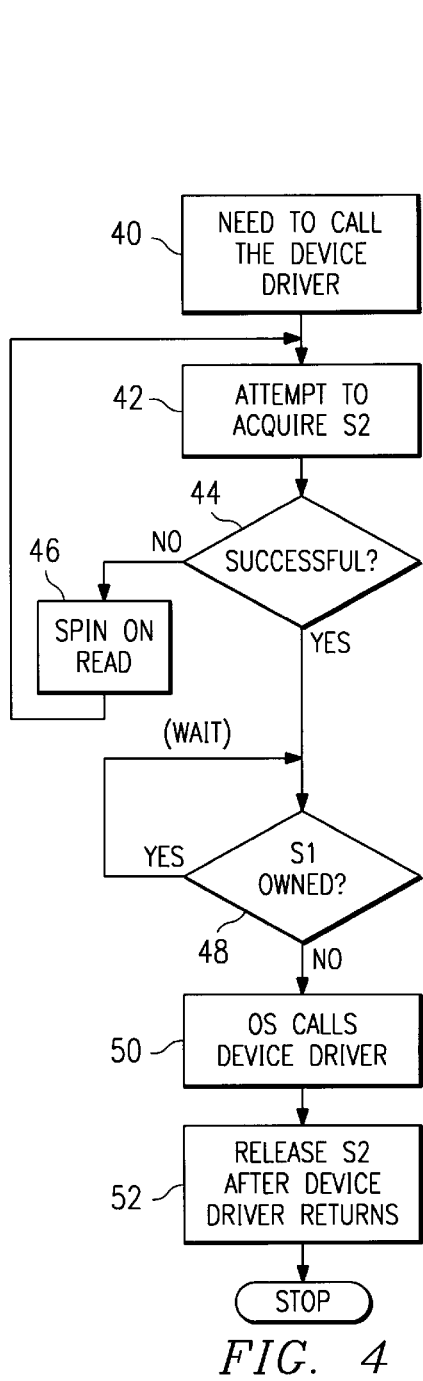
FIG. 4 is a flowchart of a preferred "task time" routine of the present invention.

FIG. 1 illustrates a computer system 10 having multiple processors 12a . . . 12n. The various processors 12 of the system 10 are preferably Intel x86-based microprocessors that are controlled by a multiprocessing operating system (OS) 14, such as the OS/2(SMP (symmetric multiprocessing) operating system available from IBM. The computer system has a number of associated external devices 16a . . . 16n such as keyboards, disk and diskette drivers and printers. Each external device 16 is controlled by software run by the operating system. The software most frequently implemented for controlling an external device is called a device driver 18. The device driver typically consists of two sections, a "task time" section, which executes when an external interrupt is not in progress, and an "interrupt time" section, which executes (e.g., under the control of the device driver's interrupt handler) when an external interrupt is in progress.

Computer system 10 also includes an interrupt mechanism 15 that allows a particular processor to respond to asynchronous events. When an interrupt signal is received, the processor immediately diverts its attention from the task currently executing, but in a manner that allows the future resumption of this task. The processor then executes a routine that is specific to each particular interrupt. Internal interrupts are those that originate inside the processor. External interrupts are those initiated by external hardware, and software interrupts are those initiated by certain software instructions.

While the remainder of the description relates to a multiprocessor system running Intel x86 processor(s) and the OS/2 SMP operating system, the inventive techniques may be implemented in other multiprocessor systems running on non Intel-based processors (e.g., RISC-based) and/or other MP-based operating systems (e.g., MVS, AIX, Windows NT, Novell Netware and others). Moreover, although the present invention is described in the context of a device driver as the "resource" being controlled by the collaborative spin locks, one of ordinary skill will appreciate that a resource may mean any operating system kernel extension such as a physical device driver, a virtual device driver, an installable file system, an actual physical device (such as keyboard, disk, a network) and the like.

The unit of execution for the x86 processor is called a task. The term thread of execution is sometimes used in a similar context. The microprocessor can execute only one task at a time. The CPU switches tasks as a result of an interrupt or of execution of certain instructions. The x86 hardware provides complete isolation between tasks. This isolation is based, among other things, on each task having its own independent address space.

In advanced operating systems (like the SMP OS) where multiple threads are allowed to execute in a multiprogramming (multi-tasking) environment, one of the functions of the OS is to allocate the processor to the runnable threads. Two primary methods are used for making the decision. An operating system will typically use a hardware timer for determining when a thread should share the processor with a similar thread at the same priority (round robin). When an external interrupt occurs, it can signal the completion of an event for which some thread was waiting on. If the thread is higher in priority than the currently executing thread, a preemption should occur. In these environments, the programmer must use proper serialization techniques to protect his code/resources because at any given time the OS may decide to give the processor(s) to another runnable thread which may also require execution at the same code path or the use of the same resource.

It is known in the prior art to use a so-called "spinlock" to provide external interrupt serialization compatibility in a multiprocessing environment. A spinlock is a software technique providing a low level and efficient method for serialization in a multiprocessor environment. Spinlocks are acquired and released. When "acquired," only the owner can execute a protected piece of code. All other requesters must wait for the owner to release ownership of the spinlock before they can acquire ownership. When the owner has completed execution of the protected code, the spinlock is said to be "released."

The mechanism to acquire and/or release a spinlock is now described. A shared memory location must exist that is accessible by all processors, and the shared memory location's contents consists of two possible states: e.g., "Clear" and "Set." The flowchart in FIG. 2 illustrates the act of "acquiring" the spinlock. It begins at step 20. At decision block 22, a determination is made if the spinlock is Clear or Set by examining the contents of the shared memory location. If the shared memory location is Set, then the lock is owned and the method cycles as illustrated. In particular, repeated attempts are made to acquire the spinlock. This technique is known as "spin on read." If the shared memory location is Clear, then the spinlock is not owned and a task can attempt to acquire ownership as follows. An attempt to own the spinlock entails executing a processor architected instruction which atomically swaps the contents of the shared memory location with a register that contains the value of Set. This is step 24. For the duration of the atomic swap, the system bus is locked to prevent access from any other source (e.g., another processor). A test is made at decision block 26 to determine if the attempt to acquire the spinlock succeeded. If not, the routine returns to step 22. If, however, the attempt to acquire the spinlock succeeded, the routine continues at step 28. In particular, what is returned in the register after the atomic swap is indication of the ownership status of the spinlock prior to the atomic swap. If Clear is returned, the spinlock was previously unowned and the task has become the new owner of the spinlock. If Set is returned, the spinlock was previously owned. Because in the latter case, the spinlock was originally Set and because a Set value was swapped in, no further modifications of the shared memory location are required. The routine then ends at step 29. This completes the description of "acquiring" the spinlock.

The flowchart of FIG. 3 illustrates the "releasing" of a spinlock. It begins at step 30. At step 32, a Clear is stored in the shared memory location, at which point the spinlock is considered to be unowned, and the routine ends at step 34.

According to the present invention, at least two (2) distinct spinlocks "collaborate" to provide a given processor (and thus the operating system) with exclusive access to a given resource in the MP computer system. The first spinlock "S1" is the "interrupt time" spinlock. The second spinlock "S2" is the "task time" spinlock. Spinlocks S1 and S2, which are run under the operating system kernel, operate together to prevent concurrent access to the resource by multiple processors of the system. In particular, the invention involves two distinct operating routines (each of which use both spinlocks): a "task time" routine that occurs prior to calling a device driver at task time, and an "interrupt time" routine that runs prior to calling a device driver's interrupt handler at interrupt time.

FIG. 4 is the task time operation, which occurs at any point that execution transfers to a device driver. This is sometimes referred to herein as "at task time." This routine begins at step 40 whenever there is a need to call a device driver. At step 42, an attempt to acquire the task time spinlock S2 is made. At decision block 44, a test is made to determine whether the attempt to acquire the task time spinlock S2 was successful. If the outcome of the test at step 44 is negative, the attempt to acquire S2 was not successful, and the routine continues at step 46 to spin S2 on read waiting for the S2 memory location to indicate it is unowned. Control then returns back to before step 42. If, however, the attempt to acquire S2 was successful, which is indicated by a positive outcome of the test at step 44, the routines continues at step 48 to determine if spinlock S1 is owned. If spinlock S1 is owned, the routine cycles as shown. If, however, the outcome of the test at step 48 indicates that spinlock S1 is not owned, it is now safe to call the device driver. This occurs at step 50. After the device driver is executed, the routine releases spinlock S2 at step 52. This completes the task time processing.

Figure 5:
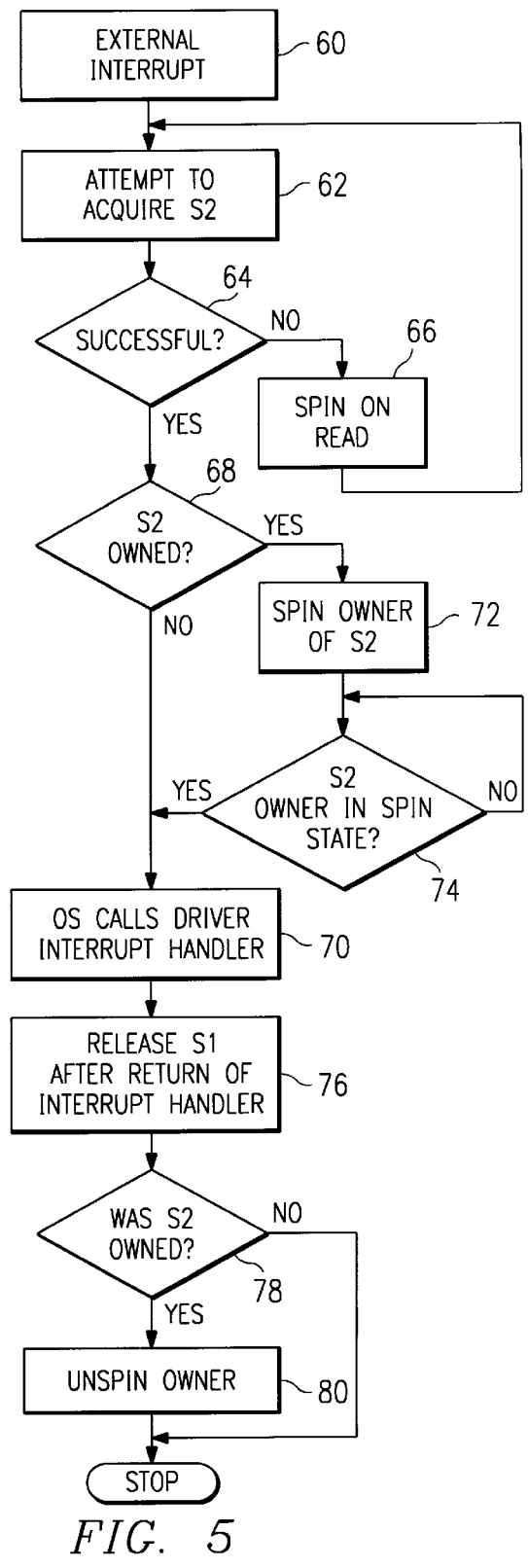
FIG. 5 is a flowchart of a preferred "interrupt time" routine of the present invention.

The interrupt time routine of the invention is shown in FIG. 5. As noted above, this routine is run prior to calling a device driver's interrupt handler at interrupt time. It is sometimes referred to herein as "at interrupt time." The routine begins at step 60 upon an external interrupt (e.g., from a disk device driver or other network device driver). The routine continues at step 62 to attempt to acquire the interrupt time spinlock S1. The routine then continues at decision block 64 to test whether the S1 spinlock was acquired. If the outcome of the test at step 64 is negative, the attempt to acquire S1 was not successful, and the routine continues at step 66 to spin S1 on read waiting for the S1 memory location to indicate it is unowned. Control then returns back to before step 62. If, however, the attempt to acquire S1 was successful, which is indicated by a positive outcome of the test at step 64, the routine continues at decision block 68 to test whether the task time spinlock S2 is owned. If spinlock S2 is not owned, the routine continues at step 70 to call the device driver interrupt handler. If, however, spinlock S2 is owned, the routine branches to step 72 during which the interrupt manager sends an interprocessor interrupt (IPI) to the processor that owns spinlock S2. Step 72 thus "spins" the owner of spinlock S2. The routine then continues at decision block 74 to test whether the owner of spinlock S2 has entered the spin state. If not, the routine cycles as shown to continue executing block 74, If, however, the outcome of the test at block 74 indicates that the owner of spinlock S2 is spinning, the routine continues at step 70 to call the device driver interrupt handler, as previously described.

After the interrupt handler executes, the routine continues at step 76 to release the S1 spinlock. Thereafter, a test is made at step 78 to determine whether the owner of spinlock S2 was spun (at step 72). If the outcome of the test at step 78 is negative, the routine is done. If, however, the outcome of the test at step 78 is positive, the routine continues at step 80 to unspin the S2 owner; thereafter, processing is complete.

Thus, in the preferred embodiment, the pair of "collaborative" spinlocks are used to protect an execution state of the device driver. At task time, and prior to calling the device driver, the task time spinlock is acquired by the operating system, which then waits until the interrupt time spinlock is in an "unowned" state before calling the device driver. Upon return from the device driver, the operating system releases the task time spinlock. At interrupt time, and prior to calling the device driver's interrupt handler, the interrupt time spinlock is acquired by the operating system, which then determines whether the task time spinlock is owned. If the task time spinlock is unowned, the operating system calls the device driver. If, however, the task time spinlock is owned, the operating system then issues an interprocessor interrupt to the processor owning the task time spinlock. This places the "receiving" processor into a "spin" state. Upon return from the device driver, the interrupt time spinlock is released and the receiving processor is placed back into its original operating state.

In the preferred embodiment, the receiving processor (i.e. the processor that owns the task time spinlock at interrupt time) spins on a predetermined or "first" memory location until that first memory location is cleared. The "sending" processor (i.e. the processor that issues the IPI to the receiving processor) uses a second memory location to determine when the receiving processor has entered the spin state.

Thus, according to the invention, at task time the device driver is called only after the operating system acquires the task time spinlock and determines that the interrupt time spinlock is unowned. At interrupt time, the device driver is called only after the operating system acquires the interrupt time spinlock and determines that the task time spinlock is either unowned or, if owned, the processor owning the task time spinlock has been placed in a predetermined "spin" condition.

One of the preferred implementations of the invention is a client application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Generalizing, the present invention covers any use of collaborative spinlocks to provide exclusive access to a resource in a computing system wherein multiple processors (or perhaps even multiple processes) contend for the resource.

The term "spinlock" is intended to be broadly construed to cover any form of shared memory location (e.g, a single bit in a bit mask, a byte, a counter, etc.) having a set of known states (e.g., Set and Clear) whose values imply "ownership" or lack of ownership with respect to some resource. Moreover, although in the preferred embodiment, only a pair of spinlocks S1 and S2 are described, it should be appreciated that multiple spinlocks may be implemented to achieve the objects of the present invention. All that is required is that, with respect to any given resource, at least two of the spinlocks are available at task time and interrupt time.

It should be appreciated by those skilled in the art that the specific embodiments disclosed above may be readily utilized as a basis for modifying or designing other techniques for carrying out the same purposes of the present invention. Further, and as noted above, although the invention has been described in terms of a preferred embodiment in a specific operating system environment, those skilled in the art will recognize that the invention can be practiced, with modification, in other and different system architectures with the spirit and scope of the appended claims.

Having thus described our invention, what we now claim as new and desire to secure by Letters Patent is set forth below in the appended claims.

What is claimed is:

1. In a multiprocessor computing system having memory shared by all processors of the computing system and including an operating system, a method for protecting the execution state of an operating system kernel extension written to run in a uniprocessor environment using a interrupt time spinlock and a task time spinlock, comprising the steps of:

at task time, prior to calling the kernel extension, having the operating system acquire the task time spinlock and then wait to call the kernel extension until the interrupt time spinlock is unowned; and at interrupt time, prior to calling the kernel extension, having the operating system acquire the interrupt time spinlock and wait to call the kernel extension until the task time spinlock is unowned or, if the task time spinlock is owned, a processor owning the task time spinlock is placed in a predetermined condition.

2. In the multiprocessor computing system as described in claim 1 wherein the predetermined condition is a spin on read.

3. In the multiprocessor computing system as described in claim 1 further including the step of having the operating system release the task time spinlock after the kernel extension is executed at task time.

4. In the multiprocessor computing system as described in claim 1 further including the step of having the operating system release the interrupt time spinlock after the kernel extension is executed at interrupt time.

5. In the multiprocessor computing system as described in claim 1 wherein the processor owning the task time spinlock at interrupt time is placed in the predetermined condition by an interprocessor interrupt (IPI).

6. In the multiprocessor computing system as described in claim 1 wherein the operating system is a symmetric multiprocessor (SMP) operating system.

7. In the multiprocessor computing system as described in claim 6 wherein the kernel extension is a device driver.

8. In a multiprocessor computing system having memory shared by all processors of the computing system and including a symmetric multiprocessor (SMP) operating system, a method for protecting the execution state of a device driver written to run in a uniprocessor environment using a interrupt time spinlock and a task time spinlock, comprising the steps of:

at task time, determining whether the task time spinlock can be acquired by the operating system;

if, at task time, the task time spinlock can be acquired by the operating system, having the operating system acquire the task time spinlock and then wait to call the device driver until the interrupt time spinlock is unowned;

at interrupt time, determining whether the interrupt time spinlock can be acquired by the operating system; and if, at interrupt time, the interrupt time spinlock can be acquired by the operating system, having the operating system acquire the interrupt time spinlock and then wait to call the device driver until the task time spinlock is unowned or, if the task time spinlock is owned, the processor owning the task time spinlock is placed in a predetermined condition.

9. In the multiprocessor computing system as described in claim 8 wherein the predetermined condition is a spin on read.

10. In the multiprocessor computing system as described in claim 8 further including the step of having the operating system release the task time spinlock after the device driver is executed at task time.

11. In the multiprocessor computing system as described in claim 8 further including the step of having the operating system release the interrupt time after the device driver is executed at interrupt time.

12. In the multiprocessor computing system as described in claim 8 wherein the processor owning the task time spinlock is placed in the predetermined condition by an interprocessor interrupt (IPI).

13. In a multiprocessor computing system having memory shared by all processors of the computing system and including a symmetric multiprocessor (SMP) operating system, a method operative at task time for protecting the execution state of a device driver written to run in a uniprocessor environment using a interrupt time spinlock and a task time spinlock, comprising the steps of:

determining whether the task time spinlock can be acquired by the operating system;

if the task time spinlock cannot be acquired by the operating system, placing the task time spinlock in a spin on read condition;

if the task time spinlock can be acquired by the operating system, having the operating system acquire the task time spinlock;

determining whether the interrupt time spinlock is owned by another processor;

if the interrupt time spinlock is unowned, having the operating system call the device driver.

14. In the multiprocessor computing system as described in claim 13 further including the step of:

if the interrupt time spinlock is owned, having the operating system wait to call the device driver until the interrupt time spinlock becomes unowned.

15. In the multiprocessor computing system as described in claim 13 wherein the method further includes the step of having the operating system release the task time spinlock after the device driver executes.

16. In a multiprocessor computing system having memory shared by all processors of the computing system and including a symmetric multiprocessor (SMP) operating system, a method operative at interrupt time for protecting the execution state of a device driver written to run in a uniprocessor environment using a interrupt time spinlock and a task time spinlock, comprising the steps of:

determining whether the interrupt time spinlock can be acquired by the operating system;

if the interrupt time spinlock cannot be acquired by the operating system, placing the interrupt time spinlock in a spin on read condition;

if the interrupt time spinlock can be acquired by the operating system, determining whether the task time spinlock is owned by a given processor;

if the task time spinlock is owned by the given processor, placing the given processor in a predetermined condition; and having the operating system call the device driver.

17. In the multiprocessor computing system as described in claim 16 further including the step of:

if the task time spinlock is not owned by another processor, having the operating system call the device driver.

18. In the multiprocessor computing system as described in claim 16 wherein the method further includes the step of having the operating system release the interrupt time spinlock after the device driver executes.

19. In the multiprocessor computing system as described in claim 16 wherein the method further includes the step of returning the given processor from the predetermined condition to a prior operating state.

20. In the multiprocessor computing system as described in claim 19 wherein the predetermined condition is a spin.

21. A computer program product in a computer-readable medium for use in a multiprocessor computing system having memory shared by all processors of the computing system and including an operating system, the computer program product for protecting the execution state of a device driver written to run in a uniprocessor environment, comprising:

an interrupt time spinlock;

a task time spinlock;

first code means, operative at task time and prior to calling the kernel extension, for controlling the operating system to acquire the task time spinlock and then to wait to call the kernel extension until the interrupt time spinlock is unowned; and second code means, operative at interrupt time and prior to calling the kernel extension, for controlling the operating system to acquire the interrupt time spinlock and then to wait to call the kernel extension until either the task time spinlock is unowned or, if the task time spinlock is owned, a processor owning the task time spinlock is placed in a predetermined condition.

22. The computer program product as described in claim 21 wherein the first code means includes means for controlling the operating system to release the task time spinlock after the device driver executes at task time.

23. The computer program product as described in claim 21 wherein the second code means includes means for controlling the operating system to release the interrupt time spinlock after the device driver executes at interrupt time.

24. A computer system, comprising:

a plurality of processors;

a symmetric multiprocessing (SMP) operating system;

at least one external device;

a device driver for controlling the at least one external device; and means for preventing concurrent access to the device driver by the plurality of processors, the preventing means comprising:

an interrupt time spinlock;

a task time spinlock;

first code means, operative at task time and prior to calling the kernel extension, for controlling the operating system to acquire the task time spinlock and then to wait to call the kernel extension until the interrupt time spinlock is unowned; and second code means, operative at interrupt time and prior to calling the kernel extension, for controlling the operating system to acquire the interrupt time spinlock and then to wait to call the kernel extension until either the task time spinlock is unowned or, if the task time spinlock is owned, a processor owning the task time spinlock is placed in a predetermined condition.

25. The computer system as described in claim 24 wherein the first code means includes means for controlling the operating system to release the task time spinlock after the device driver executes at task time.

26. The computer system as described in claim 24 wherein the second code means includes means for controlling the operating system to release the interrupt time spinlock after the device driver executes at interrupt time.

27. In a computing system wherein multiple processors contend for a resource, the computing system including an operating system, a method for protecting the execution state of the resource using a first spinlock and a second spinlock, comprising the steps of:

at a first time, and prior to calling the resource, having the operating system acquire the second spinlock and then wait to call the resource until the first spinlock is unowned; and at a second time, and prior to calling the resource, having the operating system acquire the first spinlock and wait to call the resource until the second spinlock is unowned or, if the second spinlock is owned, a processor owning the second spinlock is placed in a predetermined condition.

28. In the multiprocessor computing system as described in claim 27 wherein the first time is a task time and the second time is an interrupt time.

29. A computer program product in a computer-readable medium for use in a multiprocessor computing system having an operating system and at least one resource, the computer program product for protecting the execution state of the resource, comprising:

a first spinlock;

a second spinlock;

first code means, operative at a task time and prior to calling the resource, for controlling the operating system to acquire the second spinlock and then to wait to call the resource until the first spinlock is unowned; and second code means, operative at an interrupt time and prior to calling the resource, for controlling the operating system to acquire the first spinlock and then to wait to call the resource until either the second spinlock is unowned or, if the second spinlock is owned, a processor owning the second spinlock is placed in a predetermined condition.

* * * * *